United States Patent [19]

Berg et al.

[11] 4,032,473
[45] June 28, 1977

[54] WATER-BASED DEFOAMER COMPOSITIONS

[75] Inventors: Roald K. Berg, Milwaukee; Douglas S. Smalley, Portland, both of Oreg.

[73] Assignee: Associated Chemists, Inc., Portland, Oreg.

[22] Filed: June 4, 1975

[21] Appl. No.: 583,651

[52] U.S. Cl. .............................. 252/358; 252/321
[51] Int. Cl.$^2$ ........................................ B01D 19/04
[58] Field of Search ............................ 252/358, 321

[56] References Cited

UNITED STATES PATENTS

| | | | |
|---|---|---|---|
| 3,076,768 | 2/1963 | Boylan | 252/358 |
| 3,723,342 | 3/1973 | Shane et al. | 252/358 |
| 3,923,683 | 11/1976 | Michalski et al. | 252/321 |

Primary Examiner—Leland A. Sebastian
Attorney, Agent, or Firm—Kolisch, Hartwell, Dickinson & Stuart

[57] ABSTRACT

Water-based defoamer compositions in the form of aqueous emulsions containing, as the disperse phase, about 25–55% of a water insoluble liquid hydrocarbon, about 25–55% of a normally solid fatty acid diamide, about 1.0–7.5% of hydrophobic silica particles, and about 8–16% of a non-ionic emulsifier having an HLB of about 8–12, the percentages being based on the weight of the disperse phase. Optionally, up to about 10% of the diamide may be replaced with a silicone oil. The compositions are useful for controlling foam in pulp and paper mill operations.

6 Claims, No Drawings

WATER-BASED DEFOAMER COMPOSITIONS

BACKGROUND OF THE INVENTION

The present invention relates generally to defoamer compositions, and more particularly to water-based compositions for controlling foam in pulp and paper mill operations.

The need for effective foam control in the paper industry generally, and in alkaline pulp-making processes in particular, has prompted the development of many different defoamer compostions. Considerable commercial success has been enjoyed in recent years by hydrophobic particle-containing defoamers, such as the hydrophobic silica-containing compositions described by Boylan in U.S. Pat. Nos. 3,076,768 and 3,408,306. Typically, hydrophobic particle defoamers are produced as mineral oil dispersions comprising upwards of 80% oil by weight. In common with other petroleum-based compositions, oil base defoamers have a number of drawbacks: flammability, relatively stringent labeling, shipping and storage reqirements, and special, bothersome clean-up procedures for shipping containers, handling equipment and spills. In addition, carry-through of oil into process effluents poses potentially severe environmental problems, and inreased petroleum costs resuluting from the recent oil "crisis" makes oil-based products less attractive from a cost/performance standpoint.

Accordingly, one object of the present invention is to provide novel water-based defoamer compositions free from the drawbacks of prior art oil-based compositions.

In the soda and kraft pulping processes, commonly referred to as alkaline pulping processes, wood chips are cooked at elevated temperature and pressure in a solution composed of sodium hydroxide (soda process), or sodium hydroxide and sodium sulfate (kraft process). After draining off the spent cooking liquid, called black liquor because of its appearance, the resulting fiber suspension, or pulp, is washed substantially free of residual black liquor in multi-stage, countercurrent brown stock washers. The washed pulp is then screened to remove knots, incompletely cooked fiber clumps, and other foreign material.

Black liquor has a strong tendency to foam, even in dilute concentrations. Because of this, the control of foaming in black liquor-containing liquids is a common problem in alkaline pulp mills. Especially severe difficulties are often experienced in controlling foam in the initial or first stage brown stock washers. The black liquor in the first stage washers typically has a pH of about 12, a temperature of 165°–185° F., and a Baume of about 10–14. Prior art defoamers have generally lacked the ability to control foaming in these washers except at undesireably high (and thus uneconomical) addition rates.

Accordingly, another object of the invention is to provide improved defoamer compositions which are especially adapted to control foaming of high temperature, high pH black liquor in soda and kraft brown stock washers.

Still another object of the invention is to provide improved defoamer compositions affording effective, economical foam control in these and other alkaline pulping process steps or operations.

A further object of the invention is to provide improved water-based defoamers in the form of pumpable liquids which can be readily mixed or dispersed in aqueous pulp and paper processing systems to control foam quickly and efficiently, and which improve liquid drainage and pitch dispersal in the pulp and paper stock.

Additional objects will become apparent from the detailed description set forth below. It will be understood, however, that the invention is not limited to the specific examples given to illustrate certain preferred embodiments.

In accordance with the present invention, improved water-based defoamer compositions are provided for controlling foaming in aqueous systems, and particularly in pulp and paper mill systems. Such compositions consist of an aqueous emulsion containing a moderate amount, i.e., about 20% to 30% by weight, of a composition comprised of about 25% to 55% of a water insoluble liquid hydrocarbon, about 25% to 55% of a normally solid fatty acid diamide, about 1.0% to 7.5% of hydrophobic silica particles, and about 8% to 16% of a non-ionic emulsifier having an HLB of about 8 to 12, with the percentages being based on the weight of the composition. In certain applications a portion of the fatty acid diamide may be replaced with a silicone oil to enhance "knowk-down" of foam in the system. The novel water-based defoamer compositions of the invention are suitable for controlling foaming in a wide variety of aqueous systems, such as alkaline black liquor-containing pulp mill systems and acidic white water papermaking process streams.

DESCRIPTION OF PREFERRED EMBODIMENTS

In general terms, the defoamer compositions of the invention consist of stable aqueous emulsions containing a normally solid fatty acid diamide, hydrophobic silica particles, and, optionally, a silicone oil dispersed in a water insoluble liquid hydrocarbon, together with a suitable non-ionic emulsifier.

Diamides useful in the compositions of the invention include those obtained by reacting a polymethylene diamine containing from 2 to 6 methylene groups with a fatty acid, i.e., a long chain aliphatic carboxylic acid, having about 10 to 22 carbon atoms in the chain. Such fatty acids include capric, lauric, myristic, palmitic, stearic, arachidic, behenic, lauroleic, oleic, linoleic, linolenic, etc. Diamides based on fatty acids having 16 to 18 carbon atoms are preferred. A particularly preferred fatty acid diamide is the diamide formed from stearic acid and ethylene diamine, i.e., N,N'-ethylene bis-distearamide.

The hydrophobic silica particles are those described in U.S. Pat. Nos. 3,076,768 and 3,207,698. They include well-known forms of normally hydrophilic silica particles, such as silica aerogel, fume silica, and precipitated silica, which have been treated in some manner to render them hydrophobic. Any suitable method can be used to impart the required hydrophobic characteristic, such as treatment with organo-chlorosilane vapors or long chain amines, heating with silicone oil, etc. The hydrophobic silica particles desirably should have an average particle size of less than one micron. A commercially available hydrophobic silica obtained by reacting precipitated silica with an organic silicon compound, and having an ultimate particle size of 15 millimicrons, a surface area of about 120 square meters per gram, and a pH of about 11.5 has been used with good results. Such a product is manufactured by Philadelphia Quartz Company, Philadelphia, Pa., and marketed as Quso WR 82.

The water insoluble liquid hydrocarbon carrier for the fatty acid diamide and hydrophobic silica particles can be any liquid aliphatic, alicyclic or aromatic hydrocarbon, or mixture thereof. Its viscosity should be such that it is liquid at room temperature and atmospheric pressure. Viscosities in the range of from about 30 to 400 SUS (100° F.) are suitable, with viscosities of about 100 SUS or less being preferred. The boiling point of the hydrocarbon liquid should be at least equal to the melting point of the fatty acid diamide component of the defoamer composition. For example, with the preferred ethylene bisdistearamide, a hydrocarbon liquid having a boiling point greater than about 280° F. should be used. Suitable hydrocarbon liquids include mineral hydrocarbons such as naphthenic and paraffinic mineral oils, seal oil and similar petroleum fractions. A commercially available mineral hydrocarbon which has been found to be an effective carrier, particularly when ethylene bisdistearamide is used, is Union Oil No. 105, a pale mineral oil having a viscosity of 106 SUS at 100° F.

The optional silicone oil component of the disperse phase can be a polysiloxane oil such as an alkyl, aryl, alicycllic, or aralkyl siloxane, or polysiloxane having a viscosity of about 100 to 3,000 centistokes at 25° C. Preferred silicone oils include the alkyl polysiloxanes, such as dimethyl polysiloxane. A commercially available 1,000 cs. silicone oil sold by Stauffer Chemical Co., SWS Silicones Div., as SWS 101 fluid has been used with good results.

Non-ionic emulsifiers suitable for dispersing the hydrophobic components of the compositions in the aqueous carrier liquid include non-ionic surfactants or compatible mixtures thereof having an HLB (hydrophobic-lithophobic balance) in the range of about 8 to 12, preferably about 9 to 10. Examples of suitable non-ionic emulsifiers are condensation products of higher fatty alcohols with ethylene oxide, condensation products of alkylphenols with ethylene oxide, condensation products of fatty acid amides with ethylene oxide, polyethylene glycol esters of long chain fatty acids, ethylene oxide condensation product of polyhydric alcohol partial higher fatty acid esters and their inner anhydrides, long chain polyglycols in which one hydroxyl group is esterified with a higher fatty acid and the other hydroxyl group is etherified with a low molecular weight alcohol, etc. Compatible combinations of two or more of these emulsifiers may be used to obtain the desired HLB. For example, sorbitan monostearate having HLB of about 5 may be mixed together with polyoxyethylene (20) sorbitan monostearate having an HLB of about 15 to provide a combination having the desired HLB within the range of 8 to 12.

Especially preferred are the first-mentioned class of non-ionic emulsifiers, the ethoxylated fatty alcohols, also called polyoxyethylene fatty ethers. Unexpectedly superior performance in high pH, high temperature applications has been achieved with defoamer emulsions formed through the use of polyethoxylated stearyl alcohols, and more particularly mixtures of the reaction product of stearyl alcohol with 2 ethylene oxide units and the reaction product of stearyl alcohol with 10 ethylene oxide units in a ratio providing a mixture having an HLB of about 9–10.

The weight proportions of the ingredients forming the disperse phase of the novel aqueous emulsion defoamer compositions of the invention are as follows:

Fatty acid diamide: about 25 to 55%
Hydrophobic silica: about 1.0 to 7.5%
Water insoluble liquid hydrocarbon: about 25 to 55%
Nonionic emulsifier: about 8 to 16%
Silicone oil (optional): up to about 10% in place of a like percentage of the diamide.

The proportion of the disperse phase contained in the finished product, i.e., in the aqueous emulsion, may be varied widely. Preferably, however, to provide a product having good fluidity to allow easy handling during use, and at the same time to provide good defoaming efficiency, the proportion of the disperse phase should range between about 20% to 30% by weight of the emulsion.

In preparing the novel defoamer compositions of the invention, the hydrophobic silica is first dispersed in the water-insoluble hydrocarbon liquid. The silica may be dispersed using conventional equipment, such as a ball mill, colloid mill, or homogenizer. The siliza dispersion is then heated to a temperature sufficient to melt the normally solid fatty acid diamide, and the diamide, silicone oil (if used), and non-ionic emulsifier are blended in. After a uniform blend is obtained, the mixture is added to a suitable quantity of hot water with constant agitation, then rapidly cooled to about 90±5° F., after which the dispersion is homogenized to obtain a stable emulsion.

The novel defoamer emulsions are utilized by adding a small amount to the aqueous system in which control of foaming is desired. The exact quantity required to control foam will vary widely, depending upon the nature of the liquid being treated, the individual defoamer composition, and upon the amount of foam which can be tolerated in the process. Typically, an amount ranging from about 0.01% to 1.0% by weight based upon the weight of the solids present in the system will be used.

The water-based defoamer compositions of this invention have particular utility in controlling foam, i.e., inhibiting foam formation and destroying existing foam, in a wide variety of pulp and paper mill operations. Certain of the compositions are especially adapted for alkaline pulp mill processes. For example, compositions in which a portion of the fatty acid diamide is replaced by silicone oil and which employ polyoxyethylated stearyl alcohol emulsifier systems are particularly effective for controlling foam in brown stock washers containing hot, relatively concentrated black liquor.

When used to control foam in soda or kraft mill brown stock washers, the novel defoamer emulsions may be injected directly into a line feeding the washer showers, suitably the first or second stage showers. If added to the second stage showers, a major portion of the defoamer will be carried by the second stage filtrate to the first stage showers to control foaming of the hot, relatively concentrated black liquor in the first stage washer. The remaining defoamer will be carried with the pulp to subsequent washing and screening stages, and will remain effective to prevent the formation of excessive foam in the later stages. In addition to controlling foam, the novel compositions significantly improve drainage of the pulp during washing, thereby increasing the efficiency of the washing operation. They also act to disperse "pitch", a term used for resinous materials present in the pulp, and reduce accumulations of the pitch in and one equipment contacting the pulp.

The water-based defoamer compositions of the present invention may also be utilized to control foaming in the black liquor evaporators which form a part of alkaline pulp mill chemical recovery operations, as well as in the relatively acidic white water systems of papermaking processes.

The present invention is further illustrated by the following specific examples:

EXAMPLE I

Six parts by wt. of hydrophobic silica (Quso WR 82) is mixed into 50 parts by wt. of 106 SUS mineral oil (Union Oil No. 105 pale oil) and a uniform dispersion is obtained by homogenizing the mixture at about 2,500 psi in a Creamery Packaging emulsifier. The hydrophobic silica/oil dispersion is charged into a batch mixing tank and heated to about 250° F., after which 34 parts by wt. of N,N'-ethylene bis-distearamide (Cincinnati Milicron Chemicals 280 Wax) is added with stirring, together 10 parts by wt. of a non-ionic emulsifier having an HLB of about 9. The emulsifier is a mixture of 7 parts by wt. sorbitan monostearate (Emery Industries Emsorb 2505) and 3 parts by wt. polyoxyethylene (20) sorbitan monostearate (Emsorb 6905). The batch is then heated to 260°–280° F. and maintained at that temperature with continued agitation until a clear, homogeneous hot melt is obtained, typically about 10–15 minutes. The hot melt is then quickly dropped into 233 parts by wt. of water at 195°–200° F. in a stirred drop tank. As soon as all of the hot melt has been added to the drop tank and any lumps have been dispersed, mixing is stopped and the resulting agglomerate suspension is rapidly cooled to 85°–90° F. in a separate tank equipped with cooling coils. Finally, the cooled suspension is homogenized at 2,000–2,500 psi in a Mantin-Gaulin homogenizer and charged to a holding tank where it is allowed to cool to room temperature. The product obtained is a stable aqueous emulsion containing 30% by wt. of the disperse phase. It has the appearance and consistency of heavy cream, and is readily pumpable. Comparison testing with prior art oil-based defoamer in a West Coast kraft linerboard mill show it to be highly effective on a cost/performance basis for controlling foam in a fourdrinier machine wire pit. Improved drainage of the kraft linerboard furnish is also noted.

EXAMPLE II

A defoamer composition is prepared in the same manner described in Example I, but with the following:

| Ingredients | Parts by Wt. |
| --- | --- |
| Pale mineral oil (Union Oil No. 105) | 55 |
| Hydrophobic silica (Quso WR 82) | 2 |
| N,N'-ethylene bis-distearamide (280 Wax) | 33 |
| Non-ionic emulsifier consisting of an equal weight basis mixture of polyoxyethylene (2) stearyl ether (Atlas Brij 72) and polyoxyethylene (10) stearyl ether (Brij 76) and having an HLB of about 9.5 | 10 |
| Water | 317 |

The resulting aqueous emulsion, containing 24% by wt. disperse phase, is shown to have superior effectiveness in controlling foaming of high temperature, high pH black liquor in the first stage brown stock washers of a West Coast kraft pulp mill when compared with prior art oil-based defoamer. Carrythrough of the defoamer into subsequent washer stages is sufficient to control foaming throughout the washing process. In addition, reduced accumulation of pitch in and on the washers, screens and pulp chests are noted.

EXAMPLE III

A defoamer composition is prepared using the process of Example I and the ingredients of Example II, except that 8 parts by wt. of 1,000 cs. silicone oil (SWS 101 fluid) is added in place of a like amount of the bis-distearamide. The silicone oil is found to enhance quick "knock-down" of foam, particularly in high temperature applications.

EXAMPLE IV

A defoamer composition is prepared as in Example III, except that the following are used:

| Ingredients | Parts by Wt. |
| --- | --- |
| Pale mineral oil (No. 105) | 25 |
| Hydrophobic silica (WR 82) | 3 |
| N,N'-ethylene bis-distearamide (280 Wax) | 45 |
| Silicone oil (SWS 101) | 10 |
| Non-ionic emulsifier (equal wt. mixture of Brij 72 and 76) | 16 |
| Water | 395 |

The resulting emulsion, which contains 20% by weight disperse phase, effectively controls foaming of hot, high pH black liquor while contributing a minimum of oil to the mill effluent.

In addition, to their demonstrated effectiveness, the defoamer compositions of the present invention are highly advantageous because they eliminate a substantial percentage of the oil used in prior art defoamers. In so doing, the earlier-mentioned drawbacks characteristics of petroleum-based compositions are also eliminated. Especially important is the substantial reduction in the amount of oil contributed by the defoamer to the user's process effluent. In the pulp and paper industry, for example, it is common to retain mill effluents in large holding ponds as a pollution control measure. Oil is slow to degrade and tends to accumulate in large slicks on the pond surface. The oil also contributes substantially to the BOD (biochemical oxygen demand) level of the mill effluent. (The BOD level is used as an index of the effluent's polluton load.) A significant reduction in pulp mill holding pond BOD levels has been found to occur following the use of the water-based defoamers of the present invention in place of prior art oil-based compositions.

Having thus described the invention, it is claimed and desired to secure by Letters Patent:

1. A water-based additive for controlling foaming in aqueous systems, consisting of a stable aqueous emulsion containing as the disperse phase, about 20–30% by weight of a composition comprising:
   a. about 25 to 55 parts by weight of a water insoluble mineral hydrocarbon,
   b. about 25 to 45 parts by weight of a normally solid fatty acid diamide,
   c. about 1.0 to 7.5 parts by eight of hydrophobic silica particles, and
   d. about 8 to 16 parts by weight of a non-ionic emulsifier wherein said emulsifier is a stearyl alcohol ethoxylate, and said emulsifier has an HLB of about 9 to 10.

2. The additive of claim 1, wherein said composition additionally comprises about 1 to 10 parts by weight of a silicone oil.

3. A water-based additive for controlling foam in high temperature, high pH aqueous systems, consisting of a stable aqueous emulsion containing, as the disperse phase about 20–30% by weight of a composition consisting of:
   a. about 25 to 55 parts by weight of a mineral oil,
   b. about 25 to 45 parts by weight of a normally solid fatty acid diamide,
   c. about 5 to 10 parts by weight of a silicone oil,
   d. about 1 to 5 parts by weight of hydrophobic silica particles, and
   e. about 8 to 16 parts by weight of a non-ionic emulsifier wherein said emulsifier is a mixture of the reaction products of stearyl alcohol with 2 ethylene oxide units and stearyl alcohol with 10 ethylene oxide units, said mixture having an HLB of about 9 to 10.

4. The additive of claim 3, wherein said fatty acid diamide is N,N'-ethylene bis-distearamide.

5. A water-based defoamer for high temperature, high pH alkaline pulping systems, consisting of a stable aqueous emulsion containing, as the disperse phase, a composition consisting of:
   a. about 50 to 55 parts by weight of a mineral oil,
   b. about 25 to 30 parts by weight of N,N'-ethylene bis-distearamide,
   c. about 5 to 10 parts by weight of a silicone oil,
   d. about 1 to 3 parts by weight of hydrophobic silica particles, and
   e. about 8 to 10 parts by weight of a mixture of the reaction product of stearyl alcohol with two ethylene oxide units and the reaction product of stearyl alcohol with 10 ethylene oxide units, said mixture having an HLB of about 9 to 10.

6. The defoamer of claim 5, wherein said emulsion contains about 20% to 30% by weight of said composition.

* * * * *

UNITED STATES PATENT AND TRADEMARK OFFICE
CERTIFICATE OF CORRECTION

PATENT NO. : 4,032,473
DATED : June 28, 1977
INVENTOR(S) : Roald K. Berg

It is certified that error appears in the above-identified patent and that said Letters Patent are hereby corrected as shown below:

In the claims:

Claim 1, column 6, line 63, please delete "eight" and add therefore --weight--.

Signed and Sealed this

Twenty-second Day of July 1980

[SEAL]

Attest:

SIDNEY A. DIAMOND

Attesting Officer

Commissioner of Patents and Trademarks